United States Patent [19]
Porter et al.

[11] Patent Number: 4,562,791
[45] Date of Patent: Jan. 7, 1986

[54] CONTAINERIZED THERMAL SPRAYING PLANT

[76] Inventors: Julian Porter; Larry Suhl, both of 4674 Alvarado Canyon Rd., San Diego, Calif. 92120

[21] Appl. No.: 671,591

[22] Filed: Nov. 15, 1984

Related U.S. Application Data

[63] Continuation of Ser. No. 475,413, Mar. 14, 1983, abandoned.

[51] Int. Cl.⁴ .................. B05B 15/12; B05C 15/00
[52] U.S. Cl. ........................ 118/326; 118/DIG. 7; 98/115.2
[58] Field of Search .............. 118/72, 302, 602, 312, 118/326, 603, 610, DIG. 7, 300; 98/115 SB; 427/299, 422, 328, 421, 423; 239/83, 84; 51/425, 426, 427, 429

[56] References Cited

U.S. PATENT DOCUMENTS

| | | | |
|---|---|---|---|
| 1,633,306 | 6/1927 | Bartling | 118/302 |
| 2,259,626 | 10/1941 | Erikson | 98/115 SB X |
| 2,912,918 | 11/1959 | Mead | 51/425 X |
| 3,148,818 | 9/1964 | Charlop | 239/84 X |
| 4,096,300 | 6/1978 | Williams et al. | 118/72 X |

OTHER PUBLICATIONS

Ballard, W. E., *Metal Spraying and the Flame Deposition of Ceramics and Plastics*, Griffin & Co., London, 1963, pp. 179–199.

*Primary Examiner*—John P. McIntosh
*Attorney, Agent, or Firm*—Charmasson & Holz

[57] ABSTRACT

A containerized movable maintenance plant grouping all equipment and facilities necessary to conduct abrasive blasting and thermal spraying operations at any location, even under severe climatic and environmental conditions or restrictions. The entire plant is packaged into two standard size marine-style shipping containers; one adapted to serve as a blasting booth, the other adapted to act as a spraying booth. The blasting unit includes a powerful ventilation apparatus and a blasting medium recovery and recycling system, as well as an effluent air treatment device in order to avoid polluting the surroundings. The spraying unit includes a complete air compressing and conditioning system which can eliminate oil, moisture, and other pollutants from the compressed air in order to achieve a durable bond between the sprayed material and the receiving base.

3 Claims, 8 Drawing Figures

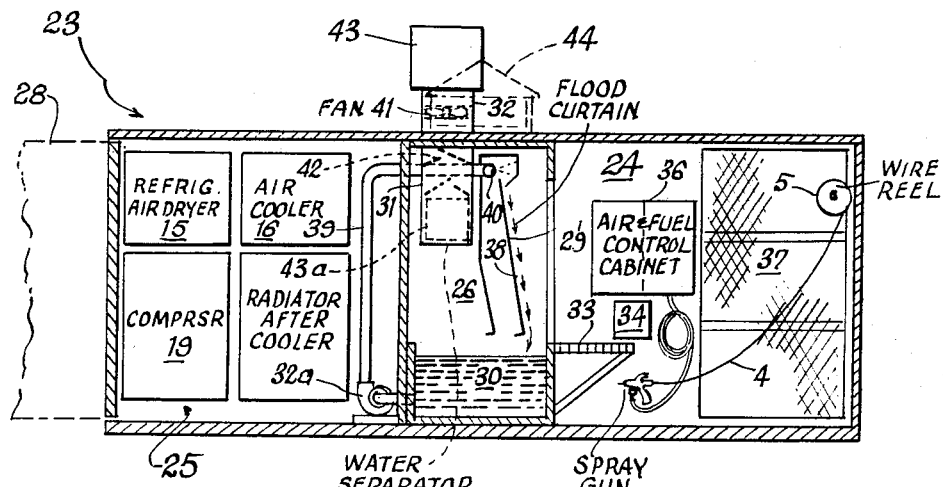
FIG. 4
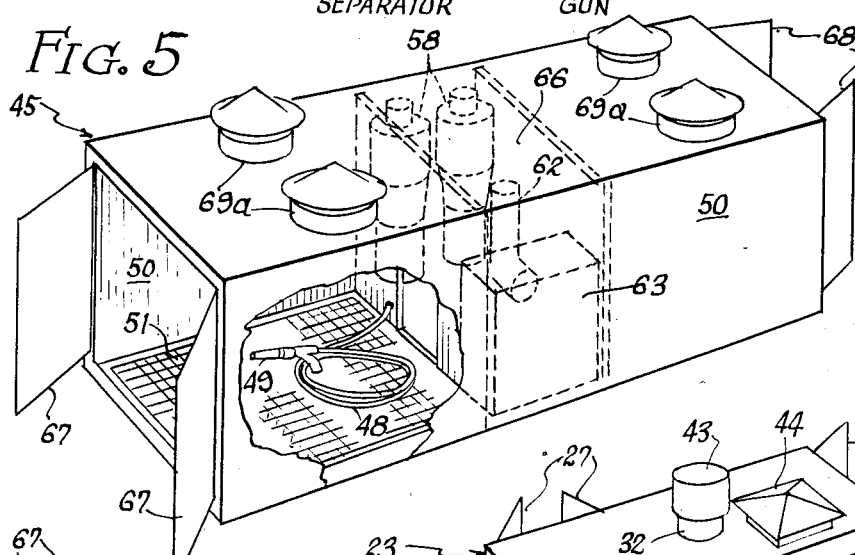
FIG. 5
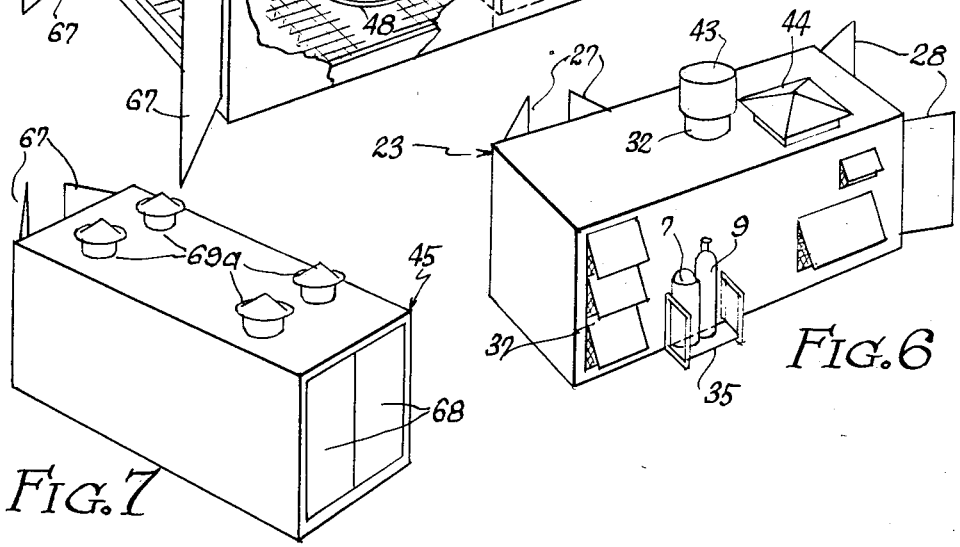
FIG. 6
FIG. 7

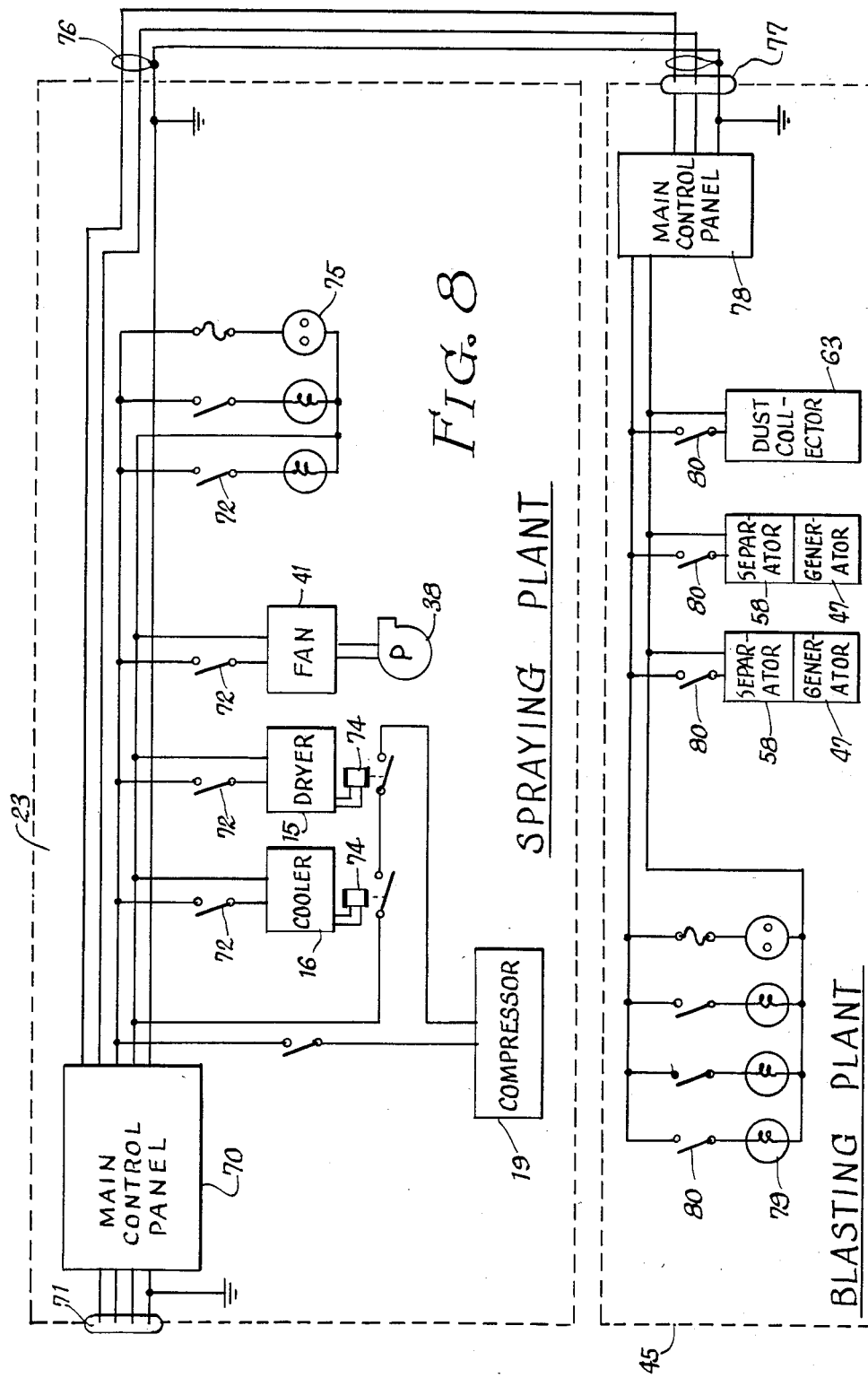

CONTAINERIZED THERMAL SPRAYING PLANT

This is a continuation of application Ser. No. 475,413 filed 3/14/83, now abandoned.

BACKGROUND OF THE INVENTION

This invention relates to abrasive metal blasting and spraying booth and supporting equipment. More specifically it relates to the equipment necessary for spraying a molten material for surface hardening and corrosion control.

The spraying or deposition of molten particles of metal, ceramic or other meltable material on a surface in order to improve its hardness, wear or resistance to corrosion is well known. The process employs either arc wire guns, combustion (oxygen acetelyne) wire guns, gas/powder guns or arc plasma to melt and spray the coating material at high temperatures onto receiving surfaces. The process creates a permanent bond between the sprayed material and the receiving base. It is used to build up worn parts, restoring them to their original dimensions, to provide protection from abrasion and wear, to control corrosion or to create a thermal or electrical barrier. The process requires that the surface to be sprayed be thoroughly cleaned and blasted to create a rough texture or "anchor tooth" designed to facilitate bonding.

The compressed air used to propel the molten material must be totally free of moisture, oil or other unwanted substances. This requires that the blasing and spraying be conducted under tightly controlled conditions in order not only to safeguard the quality of the work but also for the protection of the operators and the safeguard of the environment.

Because of these various requirements, thermal spraying has been restricted to in-plant operations. Yet, most applications, especially in the area of corrosion control, involve the treatment of heavy and bulky structures which cannot easily be transported to a processing plant. The technique could be applied to more reconstructive and maintenance works if the blasting and spraying could be conveniently conducted on location. This is particularly true in the field of marine equipment which can only be reconditioned on board ship or at some berthing sites which are usually distant from processing plants.

SUMMARY OF THE INVENTION

The principal object of this invention is to provide a complete and portable blasting and thermal spraying plant for on-the-job application.

Another object of the invention is to preserve in said portable plant all the quality control, operators' protection, and environmental safeguards found in factory operations.

A further object of this invention is to allow use of the portable plant in severely hostile climatic environments.

It is also an object of this invention to provide a means for recycling the blasting medium.

An additional object of the invention is to package said plant in standard containers for ease of shipment.

These and other useful objects are achieved by grouping, into a first standard-container-sized module, a blasting booth with supporting equipment, a blasting medium recycling system and an effluent air quality control; and in a second standard-container-size module a spraying booth, supporting equipment, a ventilation apparatus and a compressed air conditioning system, the preferred embodiment of which is described below.

BRIEF DESCRIPTION OF THE DRAWINGS

FIG. 4 is a cross-sectional view of the thermal spraying plant shown in FIG. 2;

FIG. 5 is a perspective view of a containerized abrasive blasting plant;

FIG. 6 is a perspective view in a reduced scale of the spraying plant shown in FIG. 2;

FIG. 7 is a perspective view in a reduced scale of the blasting plant shown in FIG. 5; and FIG. 8 is an electrical wiring diagram for the blasting and spraying plants.

DETAILED DESCRIPTION OF THE PREFERRED EMBODIMENT OF THE INVENTION

Figure 1:
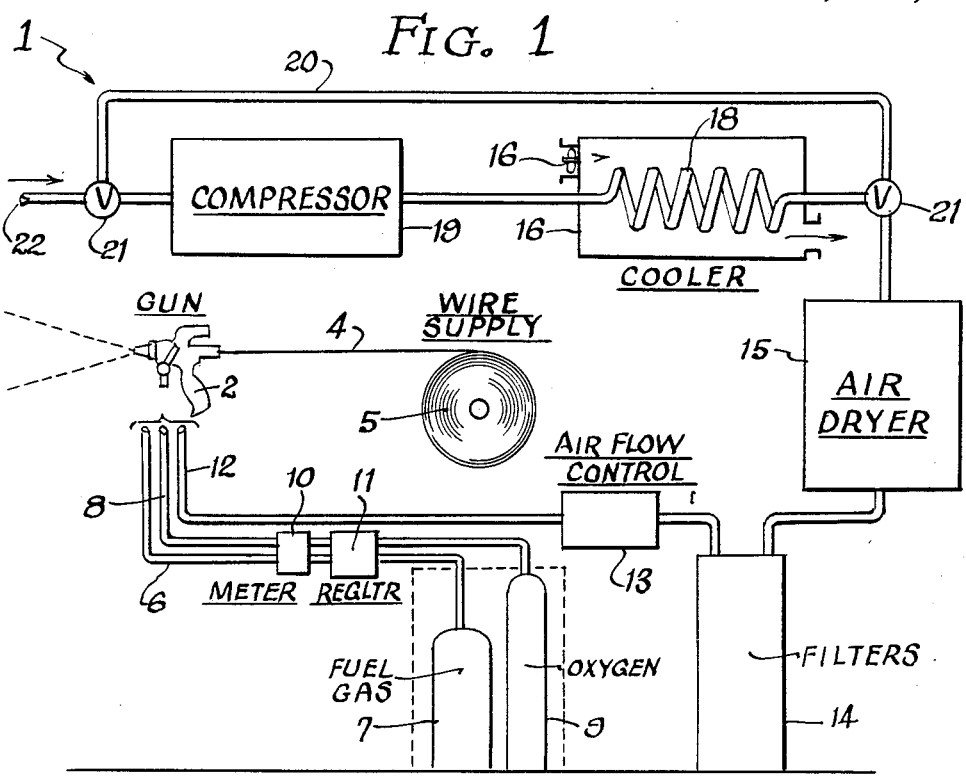
FIG. 1 is a diagrammatical illustration of a thermal spraying system and supporting equipment.

Referring now to the drawing, there is shown in FIG. 1 the principal components of a thermal spraying system 1 designed to propel against any surface molten particles of metal by means of a spray gun 2 driven by compressed air. The metal is applied to the gun in the form of a wire 4 drawn from a supply spool 5. The metal wire is melted in the nozzle of the spray gun 2 through oxidation of a gas such as acetelyne. The gas is brought to the gun from a fuel tank 7 by a flexible line 6. The oxygen is similarly drawn from a tank 9 through a flexible line 8. The supply of fuel and oxygen is controlled by a melting unit 10 and a regulator unit 11.

The inlet 22 is connected to a source of ambient air which is brought to a high pressure by an air compressor 19. A rotational type of compressor is preferably utilized, in order to avoid the high level of oil contamination inherent to common compressors using reciprocal piston movements. The temperature of the compressed air is then lowered by running it through a cooler 16 before being subjected to an air dryer 15. The cooler usually comprises a radiator 18 exposed to a flow of ambient air generated by a fan 17. The air dryer can be of the refrigerating type or a regenerative type using some type of alumina desecant. When the inlet 22 can be connected to a readily available source of compressed air, the compressor 19 and cooler 16 can be bypassed by means of the line 20 controlled by valves 21. The moisture-free air is then run through a coalescent filter 14 which extracts from it any trace of oil which may have been introduced during the compression process. The compressed air is then metered and regulated through the air flow control unit 13 and brought through a flexible line 12 to the spray gun 2. Other systems may be implemented in which the metal is melted by other processes such as a gas-powder combining gun, a arc-wire gun or an arc-plasma according to the requirements of a specific application. The previously described combustion-type wire gun system will be used in this description of the preferred embodiment of the invention.

Figure 2:
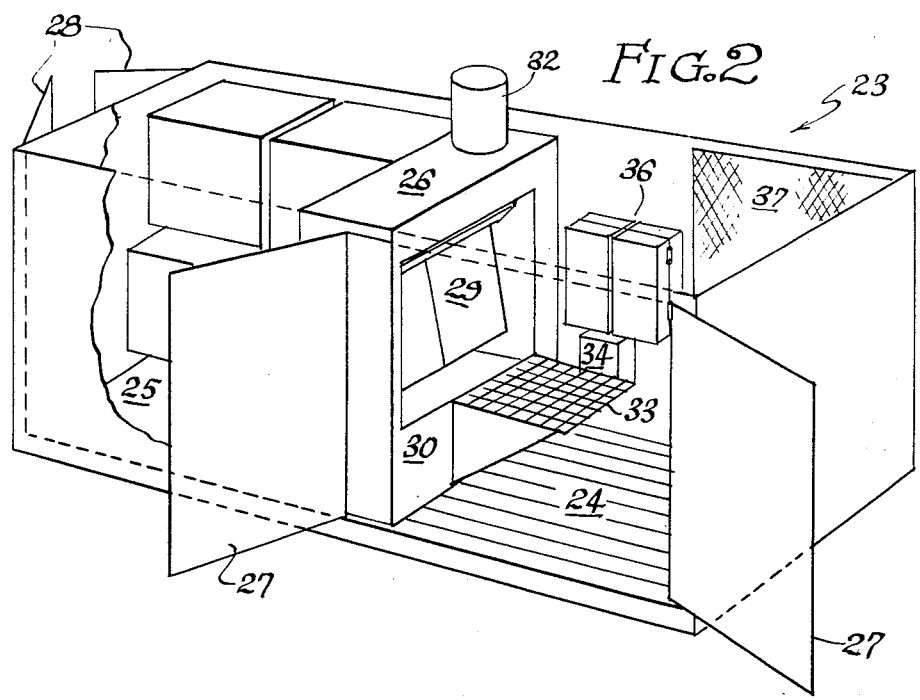
FIG. 2 is a perspective view of a containerized thermal spraying plant.

FIGS. 2, 4 and 6 illustrate the compact packaging of an entire spraying plant into a marine-style shipping container 23.

The container 23 is sub-divided into a spraying chamber 24 and an equipment chamber 25 separated by a molten particle recovery unit 26 spanning the two longest walls of the rectangular container. Each chamber can be accessed directly from the outside through its own set of double-panelled doors 27 and 28. The particle recovery unit 26 comprises a water-wash screen 29, a recovery vat 30, and an exhaust hood 31 topped by a chimney 32. The water-wash screen 29 faces the spray chamber and forms the background of a foldable work bench 33.

The only other components located in the spray chamber 24 are the metal wire reel 5 mounted against the endwall, the spray gun storage cabinet 34 and the control cabinet housing the meters and regulators, 10, 11 and 13. The fuel tanks 7 and 9 are placed on a dismountable platform 35 located against the outside backwall behind the control cabinet 36. Ambient air is admitted into the spray chamber 24 through a screened and louvered window 37.

The workpiece to be sprayed is easily placed on the workbench 33 and the spray gun 2 is as far as possible directed toward the water-wash screen 29. The water running down across the surface of a flood curtain 38 washes any flying particle of molten metal down to the vat 30. A pump 38(a) draws water from the tank 30 and forces it through pipe 39 to the spraying boom 40 at the top of the flood curtain.

A fan 41 located within the chimney 32 creates a powerful draft from the window across the spraying chamber 24, through the lower part of the flood curtain and into the hood 31. Baffles 42 are exposed within the hood to deflect any metal particle which may have passed through the flood curtain. A water separator 43(a) is installed within the chimney 32 to remove water particles carried by the powerful draft. The equipment chamber 25 houses the oil filters 14, air dryer 15, air cooler 16, the compressor 19 and an electrical control panel for the entire spraying plant. The chimney stack 43 and the air intake cover 44 for the after cooler which are located upon the roof can be conveniently dismantled and stored inside the container during shipment. The walls and ceilings of the equipment chamber 25 are padded with sound-absorbing foam material in order to dampen the noise created by the compressor.

The flexible lines 6, 8 and 12 which feed the spray gun are of sufficient length to allow use of the gun outside the spraying chamber 1 when operating on large surfaces or bulky pieces of equipment.

The various pieces of machinery used in the thermal spraying process and which have just been described are well known by those skilled in the art, are commercially available; but have never been integrated into a compact and movable facility.

Figure 3:
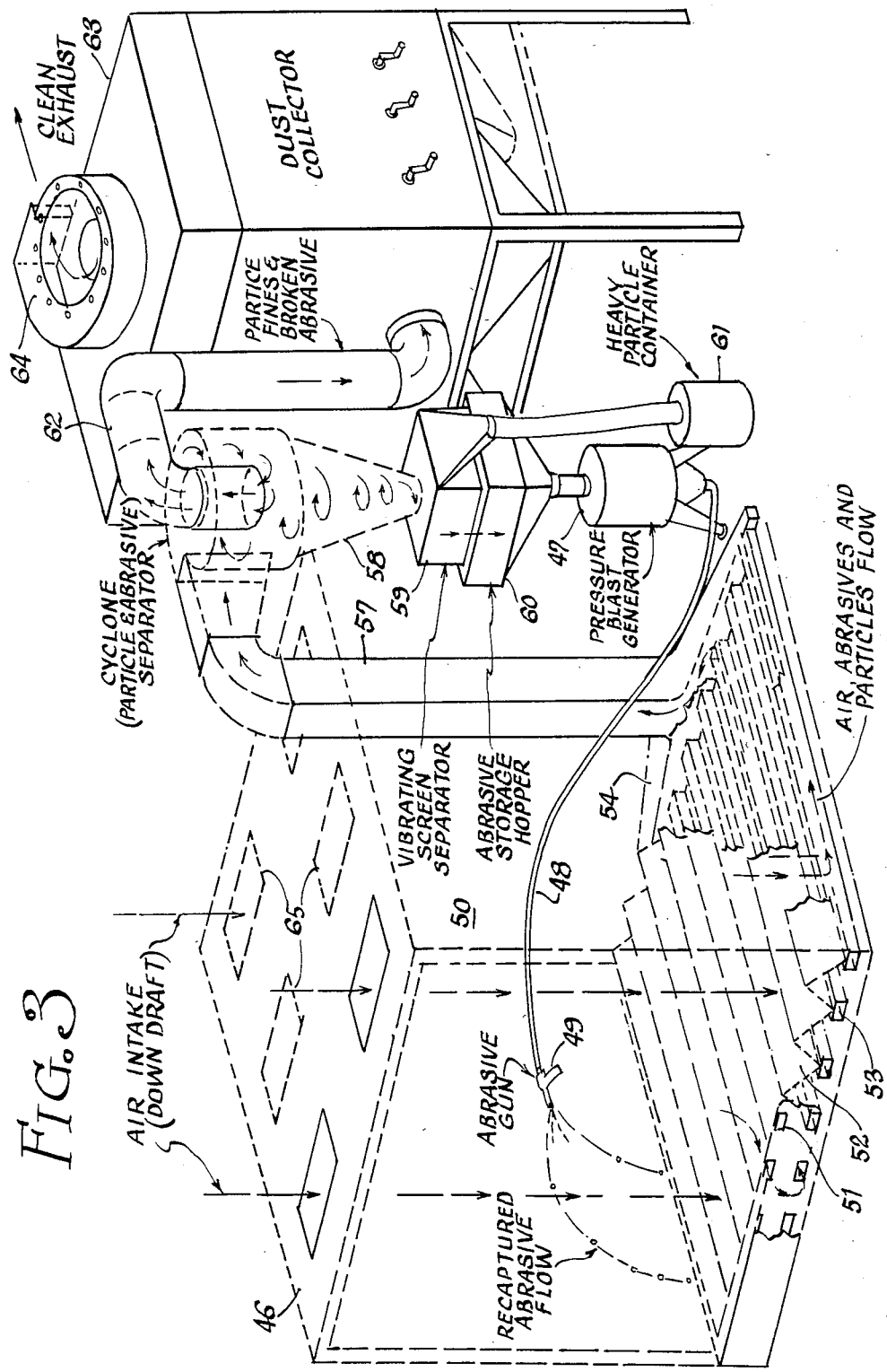
FIG. 3 is a perspective view of an abrasive blasting system and supporting equipment.

FIGS. 3, 5 and 7 illustrate an abrasive blasting plant packaged in a second marine-type container 45 of the same style and dimensions as the one used to house the thermal spraying plant 1.

The machinery used in the abrasive blasting operation 46 is illustrated in FIG. 3. The blasting medium, preferably an aluminum oxide grit, is propelled by the blast generator 47 through a flexible line 48 to a blasting gun within ventilated blasting booth 50. The grit, blasting residue and dust are sucked through a grate 51 which forms the floor of the blasting booth 50. These matters are then funneled by guiding plates 52 towards a series of collecting ducts 53. An exhaust manifold 54 connects the ducts 53 to a chimney 57 leading to a cyclone separator 58, which separate the blasted material from the blasting grit. The heavy components of the blasted material, such as metal particles, are collected in a separate container 61. The light particles such as chips of paint and broken down abrasive particles are fed to a dust collector 63 through pipe 62. The dust collector gathers these light elements and returns to the atmosphere air totally free of pollutants by way of the exhaust turbine 64. The only air intake for the system is obtained through a series of vents 65 in the ceiling of the spraying booth 50. There is thus created in the booth 50 a powerful down draft necessary to the particle-gathering operation. The separation of the abrasive medium from the heavy particle is accomplished by a vibrating sieve 59 located at the base of cyclone separator 58. A hopper 60 collects the reusable abrasive medium and feeds it to the blast generator 47.

The blast generator and gun, the cyclone separator, the sieve and dust collector are components that are well known by those skilled in the art. They are commercially available and are standard components of most abrasive blasting operations. The blasting plant 45 illustrated in FIGS. 5 and 7 houses two blasting booths 50 separated by a machine room 66. Large, two-panelled doors 67 and 68 located at each end of the container 45 give direct access into each one of the blasting booths 50. There is a door 69 between each blasting booth 50 and the machine room 66. The two blast generators 47, the two cyclone generators 58 and the dust collector 63 are located in the machine room 66. The flexible blasting gun lines 48 pass through the walls separating the blasting booth from the machine room. The ceiling air intakes 65 of each booth 50 are topped by two screened stacks 69(a) which can be conveniently dismantled and stored inside the container during shipping operations.

The diagram of FIG. 8 illustrates the electrical wiring for the entire spraying and blasting plants. The main electrical power, preferably standard three-phase four hundred hertz, is brought to an inlet 71 in the equipment room of the thermal spraying module 23. From a central electrical control panel 70 the power is distributed to a variety of switches 72 controlling the operation of the compressor 19, the cooler 16, the dryer 15, the pump 38 and fan 41 of the particle recovery unit 26 and to a plurality of light fixtures and miscellaneous outlets 75. The wiring for the compressor 19 is routed through a series of interlocking relay switches 74 in the cooler 16 and dryer 15 which do not close until the respective pieces of machinery have been activated. This configuration is necessary to guarantee that the compressor 19 will not be started until the air cooler 16 and the dryer 15 are in operation, in order to prevent the delivery of oil or moisture-polluted air to the spraying gun. An umbilical cord 76 carries electrical power to an inlet 77 in the walls of the blasting module 45. The electrical power is routed to a main control panel 78 before being distributed to various switches 80 controlling the operation of the dust collector 63, the cyclone separator 58 and blast generator 47 and a plurality of light fixtures and miscellaneous outlets 79. The current requirement for the operation of the entire facility may vary between 50 to 120 amperes depending upon the type of machinery used. The availability of this electrical power, either from public utilites or from local generators, is the only limit imposed for the location and operation of these containerized spraying and blasting plants.

The two modules 23 and 45 can be hermetically secured by replacing the various stacks with appropriate covers and transported and stored as would any marine-style container, then quickly put into operation at any job site including the decks of ships or any surface, airborne or subterranean location.

While the preferred embodiment of the invention has been described and alternate configurations have been suggested, it should be understood that other embodiments may be devised and modifications can be made thereto without departing from the spirit of the invention and the scope of the appended claims.

What is claimed is:

1. A containerized thermal coating plant which comprises:
    a first portable, self-contained rectangular enclosure having the outside dimension of a standard, transportable marine shipping container, and within said enclosure;
    a spraying chamber and an equipment chamber separated by a molten particle recovery unit spanning the two longest walls of the rectangular enclosure, each chamber being accessible directly from the outside through a separate securable door;
    said particle recovery unit comprising a water-wash screen facing the spraying chamber, a recovery vat under said water-wash screen, and an exhaust hood above it;
    the spraying chamber including:
        means for simultaneously melting and spraying a solid material within and outside said enclosure;
    means for feeding said material to said means for melting; and
    a foldable work bench mounted against the particle recovery unit, the equipment chamber including;
    a source of air;
    means for pressurizing and extracting moisture, oil and associated particulates from said air; and
    means for regulating the flow of said air to said means for melting and spraying;
    a second, self-contained portable rectangular enclosure having the outside dimension of a standard, transportable marine shipping container, said enclosure containing two blasting chambers separated by a machine room spanning the two longest walls of said second rectangular enclosure;
    each blasting chamber being accessible directly from the outside through a separate securable door and containing means for directing a blasting medium against a workpiece within said blasting chambers or outside said second rectangular enclosure; and
    said machine room containing a blast generator for propelling said blasting medium into said directing means and means for recovering said blasting medium from said blasting chambers.

2. The structure claimed in claim 1 which further comprises:
    within the exhaust hood of said particle recovery unit, means for sucking air from said spraying chamber through said water-wash screen and exhaust hood and including baffles within said hood to deflect solid particles which may pass through said water-wash screen;
    within said machine room means for separating, collecting and recycling material blasted from said workpiece from said recovered blasting medium; and
    means for filtering exhaust released to the outside of said containers.

3. The plant claimed in claim 1 wherein said means for pressurizing and extracting comprises:
    an air compressor;
    means for cooling compressed air;
    means for drying compressed air; and
    means for filtering oily substances from compressed air.

* * * * *